United States Patent [19]

Hill et al.

[11] Patent Number: 5,546,190
[45] Date of Patent: Aug. 13, 1996

[54] CARRIER AND CLOCK RECOVERY FOR LIGHTWAVE SYSTEMS

[76] Inventors: Paul M. Hill, 28 Walnut St., Millis, Mass. 02054; Robert Olshansky, 8 Old Farm Rd., Wayland, Mass. 01778

[21] Appl. No.: 942,251

[22] Filed: Sep. 9, 1992

[51] Int. Cl.$^6$ ................................. H04B 10/00
[52] U.S. Cl. ................ 359/158; 359/182; 359/189; 359/191
[58] Field of Search .................. 359/123, 124, 359/125, 132, 173, 180, 181, 182, 183, 188, 189, 190, 191, 195, 158

[56] References Cited

U.S. PATENT DOCUMENTS

| | | | |
|---|---|---|---|
| 3,546,465 | 5/1968 | Arnaud | 359/191 |
| 4,910,973 | 3/1990 | Mainardi | 455/55 |
| 4,914,735 | 4/1990 | Ichiyoshi | 342/125 |
| 4,989,200 | 1/1991 | Olshansky et al. | 359/192 |
| 5,134,509 | 7/1992 | Olshansky et al. | 359/192 |
| 5,222,103 | 6/1993 | Gross | 375/54 |
| 5,245,459 | 9/1993 | Faulkner et al. | 359/191 |

OTHER PUBLICATIONS

8 Gb/s QPSK-SCM Using Optical Coherent Detection—Hill & Olshansky, Sep. 9, 1991, ECOC/IOOC 91 Proceedings, Paris, France.

*Primary Examiner*—Richard E. Chilcot, Jr.
*Assistant Examiner*—Rafael Bacares

[57] ABSTRACT

An optical communication system includes a transmitter for generating a subcarrier multiplexed optical signal from a pilot tone, a receiver and an optical fiber for coupling the optical signal from the transmitter to the receiver. At the transmitter, an optical carrier is modulated with a composite modulation signal including a plurality of modulated microwave subcarriers to provide the optical signal and pilot tone for carrier and clock recovery. The receiver includes a local oscillator for generating a local light beam, a detector responsive to the received optical signal and the local light beam for providing a detected signal at an intermediate frequency, and a microwave receiver for receiving the detected pilot tone for simultaneously generating the subcarrier frequencies for demodulating the microwave subcarriers from the detected signal, an automatic frequency control signal for controlling the local oscillator, and the clock signal.

6 Claims, 4 Drawing Sheets

CARRIER AND CLOCK RECOVERY FOR LIGHTWAVE SYSTEMS

The invention herein described was made in the course of or under a contract or subcontract thereunder with the U.S. Navy.

FIELD OF THE INVENTION

This invention relates to optical communication systems wherein a light beam is modulated by a plurality of microwave subcarriers that are generated by a single pilot tone and, more particularly, to coherent optical communication systems wherein the pilot tone is recovered to provide simultaneously a reference signal for demodulation of the subcarrier signals, a reference signal for automatic frequency control, and a pattern independent clock.

BACKGROUND OF THE INVENTION

Optical fiber transmission systems are being extensively used in the telephone network for long distance and inter-office trunk lines because of their wide bandwidth, small size and insensitivity to electrical interference. Conventional long distance optical transmission systems utilize time division multiplexed digital transmission. The maximum data rate available in commercial lightwave systems was for many years limited to 565 megabits per second, and has only recently been increased to 1.7 gigabits per second. A 565 megabits per second optical trunk line carrying 8,000 voice channels is very cost effective for voice transmission.

Recently, efforts have been made in the telecommunications industry to utilize optical transmission systems in the local, or subscriber, loop between the central office and individual subscribers. The goal is to provide not only voice, but also data and video transmission over the optical fiber to every home and business. The video services are expected to include not only broadcast services, but also switched video services which will enable each subscriber to select programming and movies from video libraries. An uncompressed digital video signal requires a data rate of about 100 megabits per second, and analog FM video requires a bandwidth of about 30 megahertz. Even with compression, a data rate of 100 megabits per seconds is needed for high resolution entertainment video. As a result, the 565 megabit per second system, which is so effective for carrying voice channels, carries only a few video channels and must be supplemented with extensive video switching capability just to equal the channel selection presently available on cable TV. While optical fibers, laser diodes and photodiodes have more than adequate capability for bandwidths in excess of 565 megabits per second, the limiting factor is the unavailability of high speed digital electronics that are required for transmitters, for receivers and for multiplexing and demultiplexing circuits. To compete with conventional cable TV, which can provide 30 or more video channels, a subscriber distribution network based on conventional baseband digital fiber optic transmission must either operate at multigigabit per second data rates, or require extensive video switching capability.

To overcome these difficulties, microwave multiplexing of optical signals has been proposed. In these systems, a wideband microwave signal composed of many frequency multiplexed microwave carriers is used to intensity modulate a high speed laser diode. The optical signal is transmitted through a conventional single mode optical fiber to a remote location. The optical signal received at the remote location is detected with a high speed photodiode, and the transmitted signals are recovered. The microwave carriers can be modulated by either analog or digital signals and can be used to carry voice, data, video, digital audio, and high definition video, in almost any combination of services. Microwave modulated optical systems can be designed to transmit 1 to 20 gigahertz of bandwidth and can utilize the low-cost equipment presently utilized for satellite video transmission. Transmission of 60 frequency modulated video channels over 18 kilometers of optical fiber is described by R. Olshansky et al in "60-Channel FM Video Subcarrier Multiplexed Optical Communication System," *Electronics Letters*, Vol. 23, No. 22, pages 1196–1198 (Oct. 22, 1987). The transmission of ten FM video channels over 35 kilometers of optical fiber is described by W. I. Way et al in "A 1.3-μm 35-km Fiber-Optic Microwave Multicarrier Transmission System For Satellite Earth Stations," *J. Lightwave Technol.*, Vol. LT-5, No. 9, September 1987, pages 1325–1332. The transmission of three 44 megabit per second signals over two kilometers of optical fiber is described, by T. E. Darcie et al in "Lightwave System Using Microwave Subcarrier Multiplexing," *Electronics Letters*, Vol. 22, No. 15, pages 774–775 (Jul. 17, 1986). An optical local area network utilizing microwave modulation of a light beam is disclosed in U.S. Pat. No. 4,701,904 issued Oct. 20, 1987 to Darcie.

In order to provide a wide range of subscriber services, it is desirable to optimize the information-carrying capability of the optical transmission system, while maintaining high quality video transmission and low error rate digital transmission. In addition, it is desirable to increase the number of subscribers which can be connected to a single optical transmitter and to increase the distance over which the subcarrier multiplexed optical signal can be transmitted.

A technique for improving optical receiver sensitivity in comparison with direct detection techniques is to utilize coherent detection. Unlike direct detection where the intensity modulated optical signal is converted directly into a modulated electrical output, the coherent receiver first adds to the received optical signal a locally-generated optical field and detects the squared sum. The resulting photocurrent is translated in frequency from the optical domain to the microwave domain where electronic techniques can be utilized for signal processing. Coherent optical techniques are described by J. Salz in "Modulation and Detection for Coherent Lightwave Communications", *IEEE Communications Magazine*, Vol. 24, No. 6, June 1986, pages 38–49.

OBJECTS OF THE INVENTION

It is a general object of the present invention to provide improved optical communication systems.

It is the further object of the present invention to provide optically coherent subcarrier multiplexed optical communication systems, using a transmittal pilot tone to generate a pattern independent clock, a reference signal for demodulation, and a reference signal for automatic frequency control of a local oscillator at the receiver.

SUMMARY OF THE INVENTION

According to the present invention, these and other objects and advantages are achieved in an optical communication system comprising transmitter means including means for generating an optical carrier and means for modulating the optical carrier with a composite electrical modulation signal comprising a plurality of modulated microwave subcarriers generated by a single pilot tone to provide an optical signal, receiver means remotely located from the transmitter means and means for coupling the optical signal from the transmitter means to the receiver means. The receiver means includes local oscillator means for generating a local light beam, detector means responsive to the received optical signal and the local light beam for providing a detected signal at an intermediate frequency which carries the composite modulation signal and microwave receiver means responsive to the composite modulation signal from the detector means and the pilot tone for demodulating at least one of the microwave subcarriers from the composite modulation signal.

The detector means includes means for adding the received optical signal and the local light beam and providing a sum signal, means for matching the polarization of the received optical signal and the polarization of the local light beam or means for averaging the polarizations through polarization rotation or polarization diversity, and a photodetector responsive to the sum signal. The adding means can comprise a fiber optic coupler, and the local oscillator preferably comprises a narrow linewidth laser.

In one aspect of the invention the optional communication system is configured as a heterodyne system in which the optical carrier and the local oscillator laser have different frequencies. The pilot tone used to generate the subcarriers is transmitted along with the subcarrier multiplexed data. After heterodyning the received signal and filtering the result, the pilot tone is recovered to generate simultaneously by the microwave receiver the subcarrier frequencies for demodulation, the clock, and an automatic frequency control signal controlling the local oscillator.

BRIEF DESCRIPTION OF THE DRAWINGS

For a better understanding of the present invention, together with other and further objects, advantages, and capabilities thereof, reference is made to the accompanying drawings which are incorporated herein by reference and in which.

DETAILED DESCRIPTION OF THE INVENTION

Figure 1:
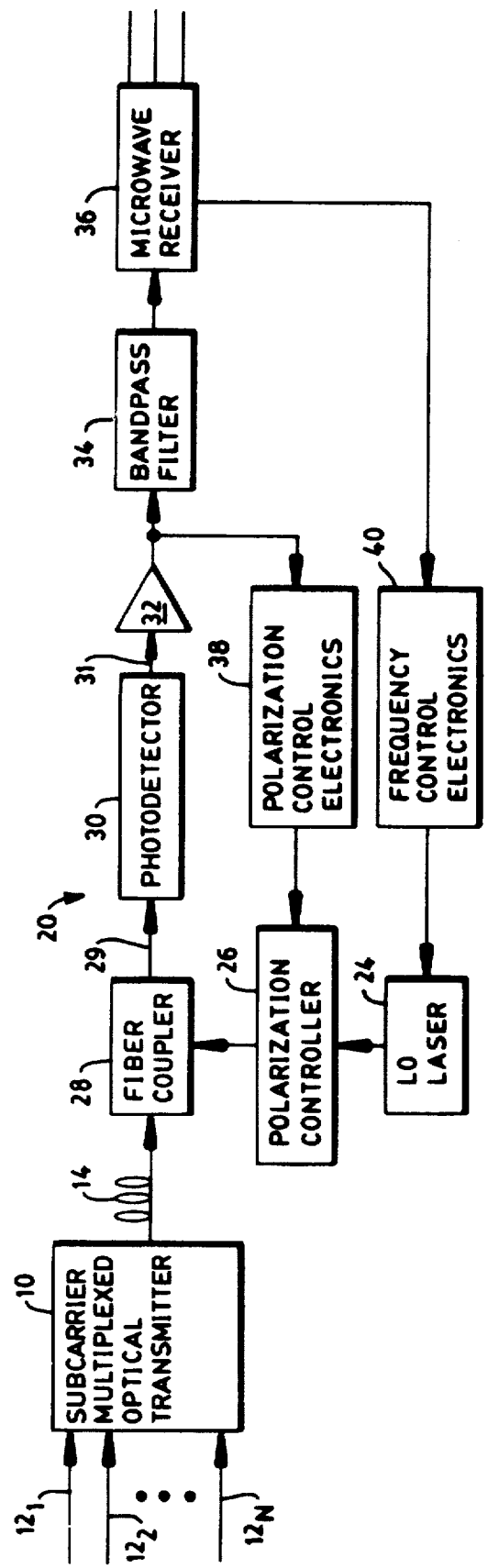
FIG. 1 is a block diagram of a subcarrier multiplexed coherent optical communication system in accordance with the present invention.

A block diagram of a coherent subcarrier multiplexed optical communication system is shown in FIG. 1. A subcarrier multiplexed optical transmitter 10 receives modulation signals on control lines $12_1$, $12_2$—$12_N$. The modulation signals which can be digital or analog signals, phase modulate different microwave subcarriers in accordance with QPSK (Quadrature Phase Shift Keying) modulation. The modulated subcarriers are combined to provide a composite modulation signal. The composite modulation signal modulates a light beam, or optical carrier, to provide an optical signal for transmission. The optical signal from transmitter 10 is coupled to one end of a single mode optical fiber 14, which carries the optical signal to a receiver assembly 20. In a typical system, the transmitter 10 and the receiver assembly 20 are remotely located from each other, and signals are coupled between them by the optical fiber 14.

A typical subscriber loop may have many users coupled to an optical fiber. The optical fiber may include optical splitters each having a predetermined signal attenuation. Each user is likely to have both a transmitter and a receiver. The system shown in FIG. 1 illustrates a single transmitter and a single receiver assembly for ease of understanding.

Figure 2:
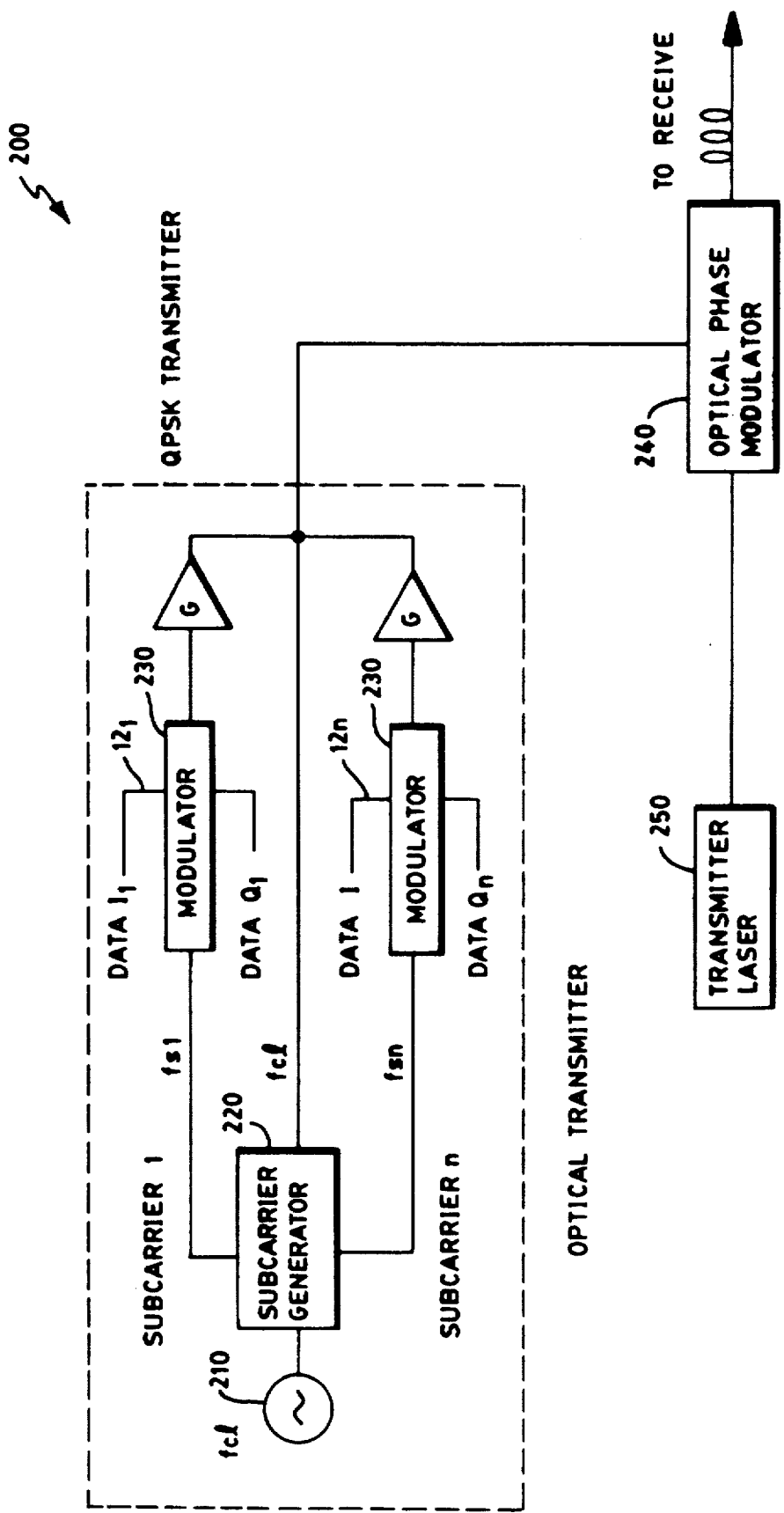
FIG. 2 is a block diagram of the transmitter for the system shown in FIG. 1 in accordance with the present invention.

Transmitter 10 is now described and shown in more detail as 200 in FIG. 2. Referring to FIG. 2, a pilot tone at frequency $f_{ct}$ is used as the source 210 for the data clock frequency and as the basis for generating multiple subcarrier frequencies $f_{s1}$ through $f_{sn}$ which are integer multiples of the pilot tone frequency $f_{ct}$ and used to modulate the data signals $12_1$ through $12_n$. The subcarrier frequencies $f_{s1}$ through $f_{sn}$ are generated by the pilot tone $f_{ct}$ through a combination of mixers in subcarrier generator 220. Data on lines $12_1$ through $12_n$ are subcarrier modulated using the subcarriers from subcarrier generator 220 at QPSK modulator 230. Transmitter 10 power combines the pilot tone at frequency $f_{ct}$ and the subcarrier modulated data from QPSK modulator 230 to provide the composite modulation signal for modulating at optical phase modulator 240 an optical carrier producing an optical signal for transmission on optical fiber 14.

Figure 3:
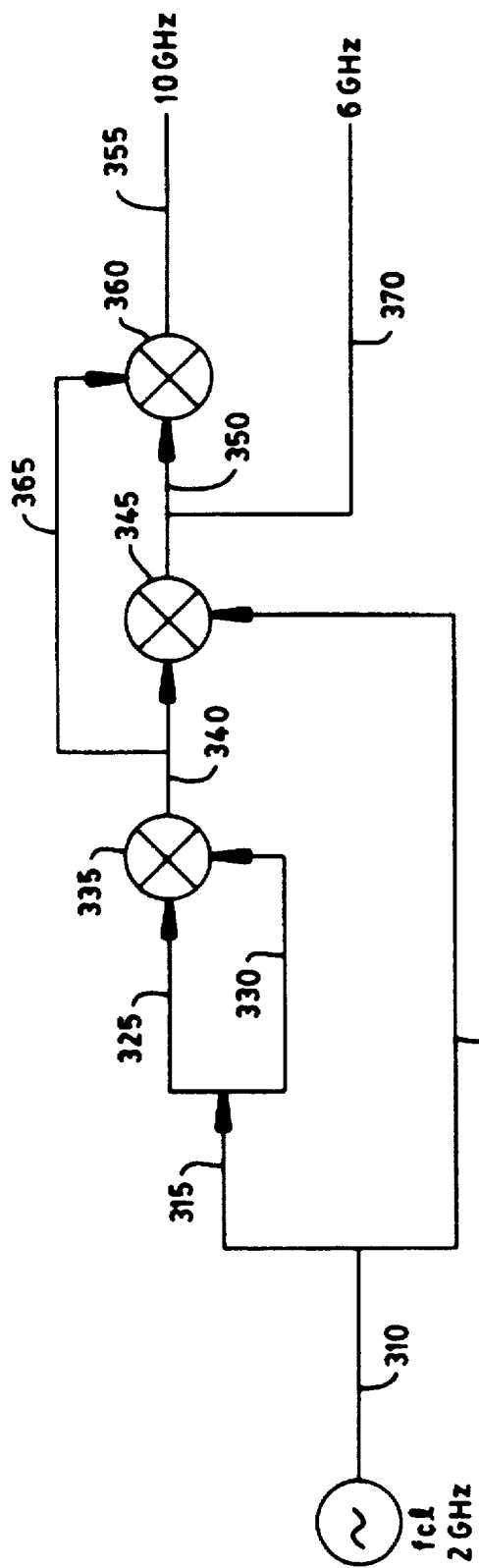
FIG. 3 is an example of a subcarrier generator in accordance with the present invention.

An example of subcarrier generator 220 is shown in FIG. 3. A source of a pilot tone at the frequency 2 GHz generates the subcarrier frequencies of 6 GHz and 10 GHz through the combination of mixers shown in FIG. 3. The 2 GHz pilot tone is input to the circuit on line 310 and is split into two 2 GHz signals on lines 315 and 320. The signal on line 315 is further split between lines 325 and 330 which are input to mixer 335 producing 4 GHz signals on line 340. The resultant 4 GHz signal on line 340 is mixed at 345 with the signal of line 320 to produce a 6 Ghz signal on line 350. The signal of line 350 is tapped by line 370 and is used as one of the subcarrier frequencies for modulating the data signals. A 10 Ghz signal is generated at 355 by mixing the 6 Ghz signal of line 350 with the 4 Ghz signal of line 340 which is fed forward to mixer 360 on line 365.

In FIG. 3 two subcarrier multiplexed data channels centered around frequencies 6 GHz and 10 GHz are shown in the frequency domain. Although only two subcarrier multiplexed data channels are depicted, this is for convenience only and one of skill in the art will recognize that any number of subcarrier multiplexed data channels can be employed in accordance with the invention. A pilot tone signal at frequency 2 GHz is used to generate the modulated subcarriers for the subcarrier multiplexed data signals as described above.

In the receiver assembly 20, a local light beam generated by local oscillator (LO) laser 24 is coupled through a polarization controller 26 to one input of a fiber coupler 28. The received optical signal on optical fiber 14 is coupled to the other input of fiber coupler 28. The laser 24 produces a narrow linewidth light beam which is summed with the received optical signal by fiber coupler 28 to provide a composite optical signal on a line 29. The composite optical signal is coupled to a photodetector 30. The output of photodetector 30 on a line 31 is an intermediate frequency equal to the difference between the carrier frequency of the received optical signal and the frequency of the local light beam. The photodetector 30 is coupled through a low noise amplifier 32 and a bandpass filter 34 to a microwave receiver 36. The laser 24 is tunable over a prescribed frequency range to effect selection of one of the microwave subcarriers in the received optical signal.

The output of amplifier 32 is coupled to the input of polarization control electronics 38, which provides a control signal to polarization controller 26. The polarization controller 26 and the polarization control electronics 38 constitute a control loop which ensures that the received optical signal and the local light beam have the same polarization. Polarization control is described by T. Okoski in *J. Lightwave Technol.*, Vol. LT-35, page 1232, 1985. Alternatively, known techniques for averaging the polarizations through polarization rotation or polarization diversity can be utilized. Microwave receiver 36 generates a signal which is coupled to the input of frequency control electronics 40, providing a frequency control signal to laser 24. The frequency control electronics 40 maintains a selected difference, equal to the intermediate frequency, between the optical carrier frequency and the local light beam frequency to eliminate the effects of drift, temperature variations and the like.

Figure 4:
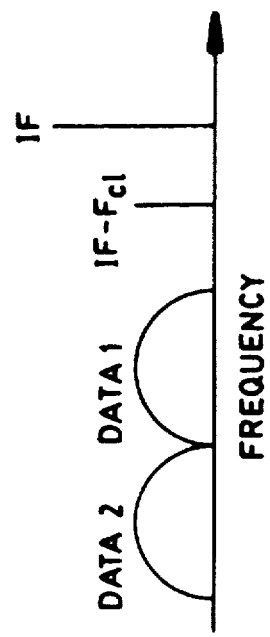
FIG. 4 is a graphical representation of the received signals in the frequency spectrum.

The receiver assembly 20 operates as a coherent receiver, since the received optical signal and the local light beam are mixed to provide an intermediate frequency. The intermediate frequency at the output of photodetector 30 is a fixed frequency determined by the difference between the optical signal carrier frequency and the local light beam frequency. FIG. 4 illustrates a representation of the signals in the frequency spectrum.

The receiver configuration shown in FIG. 1 is a heterodyne receiver. The laser 24 is a narrow linewidth laser and is tunable over a prescribed band. In a preferred embodiment of the receiver assembly 20, the laser 24 is a diode-pumped neodymium YAG laser. The polarization controller 26 is a lithium niobate polarization controller, which utilizes a control loop to detect the polarization of the received optical signal and to vary the polarization of the local light beam supplied by laser 24 to fiber coupler 28. The fiber coupler 28 can be a 2×2 tapered biconic single mode fiber coupler which operates by evanescent coupling of optical waves between adjacent optical fibers. The photodetector 30 can be an InGaAs PIN diode structure. The low noise amplifier 32 and the bandpass filter 34 are conventional microwave components.

Continuing to refer to FIG. 1, there is shown a coherent subcarrier multiplexed optical communication system in accordance with the present invention. Elements that are common with the system of FIG. 1 have the same reference numerals. A receiver assembly includes a fixed local oscillator laser 24. The output of photodectector 30 is supplied through the low noise amplifier 32 to microwave receiver 36 for generating the data clock frequency, the subcarrier reference frequencies and the automatic frequency control (AFC) signal to the local oscillator (LO). Polarization control is performed by polarization controller 26 and polarization control electronics 38, and frequency control is performed by frequency control electronics 40 as described hereinabove.

Figure 5:
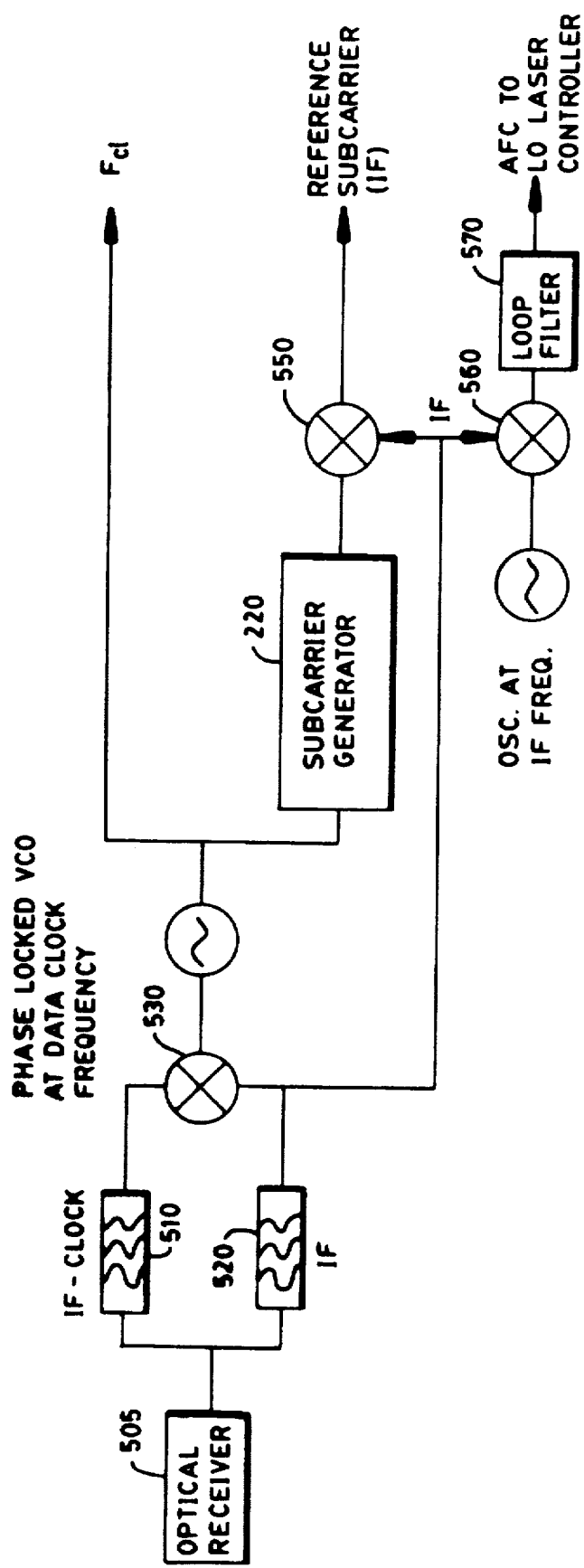
FIG. 5 is a diagram of the microwave receiver in accordance with the instant invention.

Referring now to FIG. 5 wherein a block diagram of microwave receiver 36 is depicted. Optical receiver 505 is shown for completeness sake, but is not a component of microwave receiver 36. Optical receiver 505 comprises the blocks enumerated 28 through 40 in FIG. 1 with the exception of microwave receiver 36. The pilot tone and the optical beat intermediate frequency are isolated with 1% bandpass filters at 510 and 520. The resultant signals are input to mixer 530 producing a tone at the original transmitter clock frequency $f_{cl}$. The recovered clock is output and also used to generate all the subcarrier frequencies for demodulation using the same method employed by the subcarrier generator 220 at the transmitter as was previously described and shown by example in FIG. 2. While the frequency shifts are identical, the differential delay for the QPSK signal and reference LO paths at the receiver demodulation courses a phase error. To rectify the phase error, the newly generated subcarriers at 540 are remixed at 550 with the IF signal from bandpass filter 510 to obtain the proper demodulation reference carrier.

Automatic frequency control (AFC) is achieved by phase-locking the LO laser to a free running standard in a configuration as discussed by Atlas and Kazovsky in "2 Gbit/s PSK Heterodyne Communication System Using Optical Phase-Locked Loop", Electronic Letters, Vol. 26, No. 14, pp 1030–1032 (1990) and by Gliese et al. in "Laser Linewidth Requirements and Improvements for Coherent Optical Beam Forming Networks in Satellites", *Journal of Lightwave Technology*, Vol. 9, No. 6, pp 779–790 (1991). Phase-locking is acquired by comparing a standard source oscillator to the received reference in a phase detector 560. The reference is the intermediate frequency (IF). The output of the first-order loop filter 570 is sent to the receiver LO laser controller. The filter 570 employs a dc coupled amplifier, two variable resistors, and a capacitor to stabilize the optical beat frequency drift. With the AFC established, the IF reference and clock achieve phase-lock simultaneously.

Thus according to one of the advantages of the invention the microwave receiver generates simultaneously from the originally transmitted pilot tone the subcarrier frequencies for demodulation, the clock, and an automatic frequency control signal controlling the local oscillator.

While there have been shown and described what are at present considered the preferred embodiments of the present invention, it will be obvious to those skilled in the art that various changes and modifications may be made therein without departing from the scope of the invention as defined by the appended claims.

What is claimed is:

1. An optical communication system comprising:

transmitter means including means for generating an optical carrier and means for modulating the optical carrier with a composite modulation signal comprising a pilot tone and a plurality of modulated subcarrier frequencies generated from said pilot tone to provide an optical signal; and receiver means remotely located from said transmitter means and means for coupling said optical signal from said transmitter means to said receiver means, said receiver means including local oscillator means controlled by an automatic frequency control signal for generating a local light beam, said local oscillator means being tunable over a prescribed frequency range, detector means responsive to the received optical signal and said local light beam for providing a detected signal at an intermediate frequency which carries said composite modulation signal, and electrical receiver means responsive to the composite modulation signal from said detector means for simultaneously generating from said pilot tone of the detected signal a clock signal for demodulating said subcarriers from said composite modulation signal, said automatic frequency control signal for controlling said local oscillator means.

2. An optical communication system as defined in claim 1 wherein said detector means includes
   means for adding the received optical signal and said local light beam and and providing a sum signal, and
   a photodetector responsive to the sum signal.

3. An optical communication system as defined in claim 2 wherein said adding means comprises a fiber optic coupler.

4. An optical communication system as defined in claim 1 wherein said local oscillator means includes a narrow linewidth laser.

5. An optical communication system as defined in claim 1 wherein the transmitter means includes mixer means for generating subcarriers from said pilot tone.

6. An optical communication system as defined in claim 1 wherein the electrical receiver means includes mixer means for generating subcarriers for demodulation from said pilot tone.

* * * * *